(12) United States Patent
Boyce et al.

(10) Patent No.: US 8,376,125 B2
(45) Date of Patent: Feb. 19, 2013

(54) APPARATUS FOR STACKING AND RECLAIMING MATERIAL

(75) Inventors: Benjamin Boyce, Spokane, WA (US); Glenn Davis, Spokane, WA (US)

(73) Assignee: FLSmidth A/S, Valby (DK)

( * ) Notice: Subject to any disclaimer, the term of this patent is extended or adjusted under 35 U.S.C. 154(b) by 0 days.

(21) Appl. No.: 13/571,905

(22) Filed: Aug. 10, 2012

(65) Prior Publication Data
US 2012/0298479 A1 Nov. 29, 2012

Related U.S. Application Data (62) Division of application No. 12/482,558, filed on Jun. 11, 2009.

(51) Int. Cl.
*B65G 47/00* (2006.01)
(52) U.S. Cl. ........ 198/617; 198/303; 198/508; 198/585; 198/594; 414/522
(58) Field of Classification Search ................. 198/585, 198/300, 303, 311, 364, 508, 570, 588, 617, 198/594; 37/305; 414/133, 522
See application file for complete search history.

(56) References Cited

U.S. PATENT DOCUMENTS

| | | | |
|---|---|---|---|
| 1,996,488 A | 4/1935 | Philips | |
| 3,297,141 A | 1/1967 | Janitsch et al. | |
| 3,604,757 A | 9/1971 | White | |
| 3,653,486 A | 4/1972 | McLean et al. | |
| 4,406,361 A | 9/1983 | Konigs et al. | |
| 4,629,060 A | 12/1986 | Schlegel et al. | |
| 4,776,445 A * | 10/1988 | Zitz et al. ................. | 198/303 |
| 5,234,094 A | 8/1993 | Weyermann et al. | |
| 6,085,890 A | 7/2000 | Kelly et al. | |
| 6,098,780 A | 8/2000 | Kelly et al. | |
| 6,332,736 B1 * | 12/2001 | Cape et al. ............... | 404/75 |
| 6,360,876 B1 | 3/2002 | Nohl et al. | |
| 6,782,993 B2 | 8/2004 | Bernard et al. | |
| 6,896,123 B1 | 5/2005 | Horak | |
| 8,276,736 B2 * | 10/2012 | Steele ................... | 198/303 |
| 2001/0032402 A1 | 10/2001 | Russell et al. | |
| 2003/0136632 A1 | 7/2003 | Bernard et al. | |
| 2007/0102263 A1 | 5/2007 | Hoffmann | |

FOREIGN PATENT DOCUMENTS
WO 2008138418 A1 11/2008

OTHER PUBLICATIONS

International Search Report and Written Opinion dated Aug. 19, 2010.
Bulk Solids Handling Magazine, vol. 29, 2009, No. 1 p. 9.
RAHCO Stockpiling/Reclaiming Systems brochure and photographs.

\* cited by examiner

*Primary Examiner* — Joseph A Dillon, Jr.
(74) *Attorney, Agent, or Firm* — Buchanan Ingersoll & Rooney PC (57) ABSTRACT

A mobile stacking and reclaiming apparatus includes a moveable bridge, a moveable hopper and a moveable tripper. The moveable bridge has a first end, a second end, and at least one intermediate portion between the first and second ends. The moveable hopper is connected to the moveable bridge. The moveable hopper is moveable relative to the moveable bridge along at least a portion of the moveable bridge. The moveable tripper is also connected to the moveable bridge. The moveable tripper being moveable relative to the moveable bridge along at least a portion of the moveable bridge. A system is also disclosed that includes at least one mobile stacking and reclaiming apparatus adjacent to at least one stacking overland conveyor configured to convey material for stacking material and at least one reclaiming overland conveyor configured to convey material for reclaiming material. A method of providing such systems is also disclosed.

18 Claims, 11 Drawing Sheets

APPARATUS FOR STACKING AND RECLAIMING MATERIAL

CROSS-REFERENCE TO RELATED APPLICATIONS

This a divisional of U.S. patent application Ser. No. 12/482,558.

FIELD OF THE INVENTION

The present invention relates to material handling and, more particularly, relates to apparatuses and methods for stacking and reclaiming material, such as ores, minerals or agglomerated material.

BACKGROUND OF THE INVENTION

Conveyors may be used in stackers to stack material or reclaim material from a stack. Typically, systems designed for stacking and reclaiming material utilize a number of conveyors. One set of conveyors is typically used to convey material to a stacker for stacking in a particular area. Another set of conveyors is used to reclaim the material stacked in that area. Examples of systems used to stack material or reclaim material are disclosed in U.S. Pat. Nos. 6,782,993, 6,085,890, and 3,604,757, and U.S. Patent Application Publication No. 2007/0102263, and World Intellectual Property Organization Publication No. WO2008/138418.

In addition to conveyors, other devices are typically used in stacking and reclamation systems. For instance, a stacker is typically used to stack material transported by the stacking conveyor system. A reclaimer, such as a bucket wheel reclaimer, may be used for reclaiming the stacked material and placing that material on a reclaimer conveyor. Examples of stackers and reclaimers are disclosed in U.S. Pat. Nos. 3,297,141, 3,653,486, 4,406,361, 4,629,060, 6,360,876, and 6,896,123.

One previous system used for stacking material included using radial stackers and grasshopper conveyors. The radial stacker in such systems is configured to work in a circular path and often has an extendable conveyor head to increase the stacker's stacking capacity. Once the radial stacker completed its rotation at a first location, the head of the stacker may be extended and the stacker could reverse its path to further stack material. After the stacker had finished stacking the material at the first location, the stacker would need to be moved to a new location to stack material at the new location or new portion of a predefined area for stacking material. Such movement often takes a significant amount of time. For instance, the stacker may need to be moved by a lifting device or by moving the stacker. Also, additional extension conveyors would need to be added to a system to extend the material flow to the stacker. Such movement requires the system to be shut down during each movement of the stacker. Further, there are wasted corners in the stacking of the material that the circular path of the radial stacker cannot utilize such that several thousand tons of capacity in a stacking area may be not be utilized. Moreover, a separate set of conveyors is typically needed to reclaim material off the stacked pile, which can make such systems very expensive.

Another previous system can use a racetrack system similar to leach pad stacking. The racetrack system typically uses a mobile stacking bridge conveyor, a mobile reclaim conveyor, a bucket wheel reclaimer, a central corridor feed overland conveyor and a corridor reclaim overland conveyor. The feed and reclaim overland conveyors may run parallel, but in different directions. Such a system often requires the blending of reclaimed material into a circuit of conveyors. In the event there are different materials to be stacked, the mobile reclaim or mobile stacking conveyor must be moved in a complex path that requires movement between different piles of material. Such movement is often time consuming and requires multiple complex pivots. Moreover, such movement requires a substantial mount of space for performing movement between different material piles so the amount of space that may be utilized for stacking can be significantly minimized or underutilized. Such systems can also require very complex site layouts that include tunnels for the mobile conveyors to travel over the corridor conveyors when stacking or reclaiming. Further, such a stacking and reclaiming system cannot stack or reclaim during the movement of the conveyors.

A system for stacking and reclaiming is needed that provides for the utilization of more space for stacking. Such a system should also provide for as simple a site layout as possible for the stacking and reclaiming of material. Preferably, such a system is configured to decrease the amount of time the stacking or reclaiming needs to be stopped for adjustment or movement of stacking or reclaiming devices such as stackers, bucket wheels or conveyors.

SUMMARY OF THE INVENTION

A mobile stacking and reclaiming apparatus includes a moveable bridge, a moveable hopper and a moveable tripper. The moveable bridge has a first end, a second end, and at least one intermediate portion between the first and second ends. The moveable hopper is connected to the moveable bridge and is moveable relative to the movable bridge along at least a portion of the moveable bridge. The moveable tripper is also connected to the moveable bridge and is moveable relative to the moveable bridge along at least a portion of the moveable bridge.

The moveable hopper may be attached to the moveable tripper. Preferably, the moveable hopper is releasably connected to the moveable tripper such that the moveable tripper and moveable hopper are independently moveable when separated and synchronously move when interconnected.

In some embodiments of the mobile stacking and reclaiming apparatus, the moveable bridge includes a first conveyor that is moveable in at least one direction. The first end, second end and/or one or more intermediate portions may support the first conveyor. The moveable tripper may include an inclined conveyor and a cross conveyor. The inclined conveyor may be positioned adjacent to the cross conveyor and is configured to feed material to the cross conveyor. The cross conveyor is transverse to the first conveyor and the inclined conveyor. Preferably, the cross conveyor is perpendicular to the first conveyor and the inclined conveyor.

Embodiments of the mobile stacking and reclaiming apparatus can also include a moveable hopper that includes a plurality of interconnected sidewalls that define an opening sized and configured to receive material form a reclaimer. The opening of the moveable hopper is preferably sized and configured to permit material to pass through the opening and onto the first conveyor. The movable hopper may also be configured to releasably connect to a portion of a reclaimer to help ensure that the material from the reclaimer is fed through the opening of the hopper.

The first end and/or the second end of the mobile bridge may have a luffing end that is moveable from a retracted position to an extended position. Alternatively, at least one of the first end and the second end of the moveable bridge may be extendable from a retracted position to an extended position. Movement of an end from an extended position to a retracted position can form a gap or opening sized to permit vehicles to pass adjacent to the mobile stacking and reclaiming apparatus. Movement of an end of the moveable bridge from a retracted position to an extended position may permit the mobile stacking and reclaiming apparatus to receive material from different conveyors or other devices.

Some embodiments of the mobile stacking and reclaiming apparatus can also include a plurality of rails that extend along at least a portion of the moveable bridge. The rails are sized and configured to define a path of travel for the moveable hopper and the moveable tripper.

A system for reclaiming and stacking material is also provided. The system includes at least one stacking overland conveyor, at least one reclaiming overland conveyor, and at least one mobile stacking and reclaiming apparatus. The one or more stacking overland conveyors are configured to convey material for stacking material. The one or more reclaiming overland conveyors are configured to convey material for reclaiming material. The one or more mobile stacking and reclaiming apparatuses are positioned adjacent to the one or more stacking overland conveyors and one or more reclaiming overland conveyors to reclaim material from at least one storage pile and stack material received from one or more of the stacking conveyors in at least one storage pile.

Embodiments of the system may also include one or more reclaimers that are positionable adjacent to the moveable hopper to reclaim material. Preferably, at least one of the reclaimers is a bucket wheel reclaimer.

Some embodiments of the system include one or more of the mobile stacking and reclaiming apparatuses being positioned between one or more stacking overland conveyors and one or more reclaiming overland conveyors. The mobile stacking and reclaiming apparatuses of such a system preferably include a first conveyor supported by the first end, second end or one or more intermediate portions of the moveable bridge that is moveable in a first direction. Movement of the first conveyor in the first direction may stack and reclaim material.

Other embodiments of system include one or more of the mobile stacking and reclaiming apparatuses positioned such that the first end of the moveable bridge is positioned adjacent to one or more stacking overland conveyors and one or more reclaiming overland conveyors. The mobile stacking and reclaiming apparatuses of such a system preferably include a first conveyor supported by the first end, second end or one or more intermediate portions of the moveable bridge that is moveable in a first direction and a second direction that is opposite the first direction. Movement of the first conveyor in the first direction may stack material and movement of the first conveyor in the second direction may reclaim material from a storage pile.

Embodiments of the system may also include mobile overland hoppers that may be positioned adjacent to a reclaiming overland conveyor to receive material from a mobile stacking and reclaiming apparatus and feed that material onto a reclaiming overland conveyor. Embodiments of the system may also include one or more mobile overland trippers positioned adjacent to a stacking overland conveyor. The mobile overland tripper may feed material from the stacking overland conveyor onto a mobile stacking and reclaiming apparatus for stacking the material.

A method of providing a system for reclaiming and stacking material is also provided. Embodiments of the method can include providing at least one overland reclaiming conveyor, providing at least one overland stacking conveyor and providing at least one mobile stacking and reclaiming apparatus. Embodiments of the method may also include providing embodiments of the above mentioned systems, which are also discussed in more detail below.

It should be understood that a general contractor may be considered to provide all the features of the method even if certain portions of creating or providing that feature is subcontracted out to a third party. For instance, a general contractor provides a client an overland conveyor even if a subcontractor makes the overland conveyor or installs the overland conveyor pursuant to an agreement with the general contractor. It should also be understood that a general contractor should be considered to provide a conveyor or mobile stacking and reclaiming apparatus by offering to make or install such a device for a client.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of apparatuses and systems for stacking and reclaiming material are shown in the accompanying drawings in which:

DETAILED DESCRIPTION OF PRESENT PREFERRED EMBODIMENTS

Figure 1:
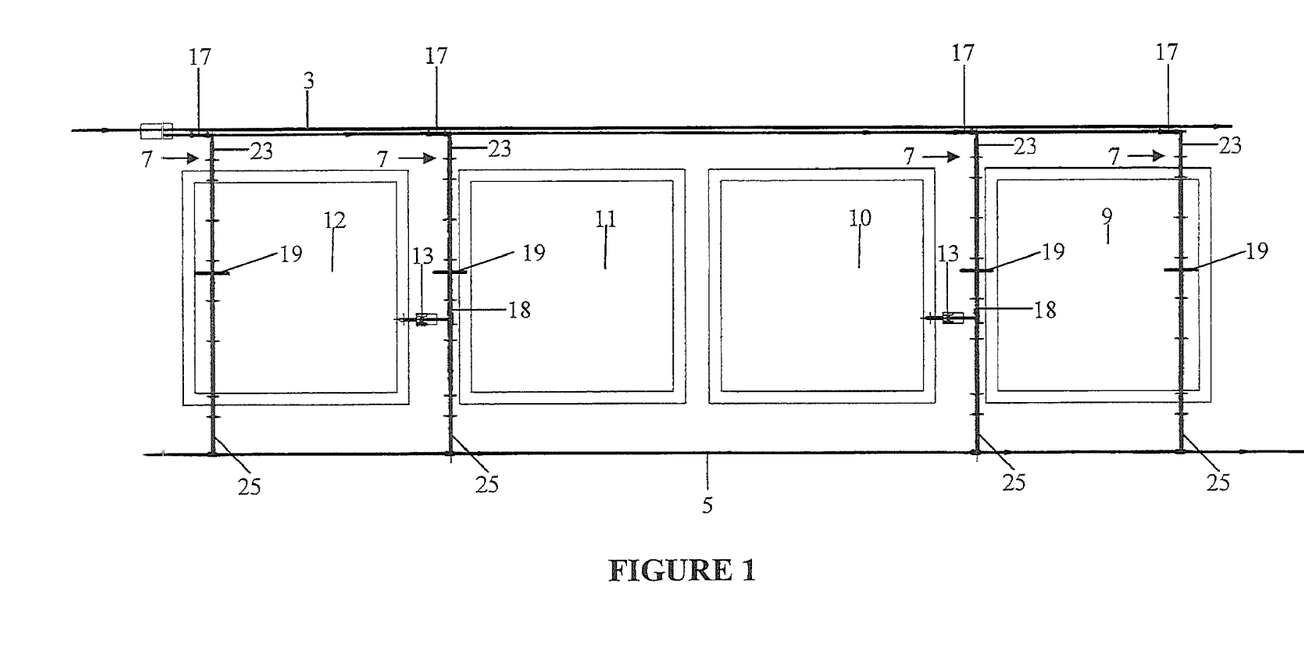
FIG. 1 is a layout of a first present preferred embodiment of a stacking and reclaiming system.
Figure 2:
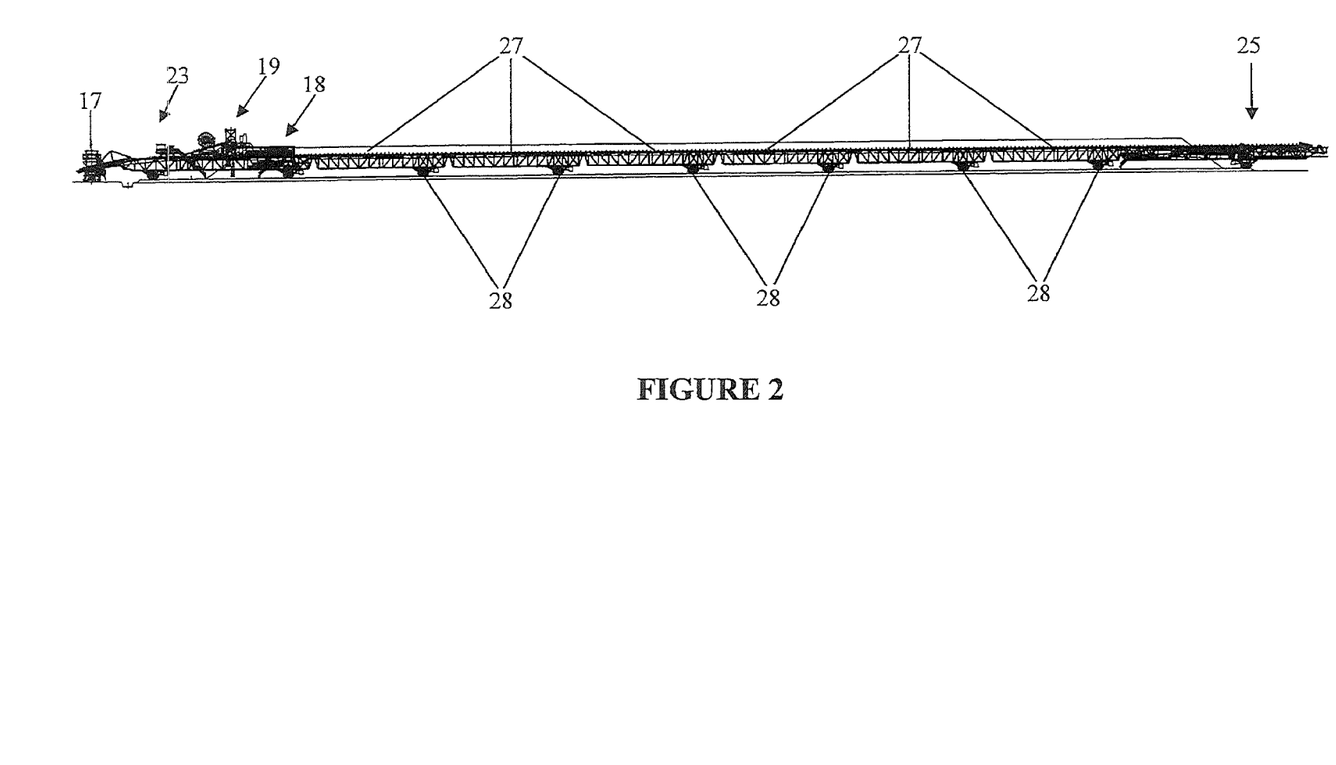
FIG. 2 is a side elevation view of a present preferred mobile stacking and reclaiming conveyor apparatus that may be used in the first present preferred stacking and reclaiming system.
Figure 3:
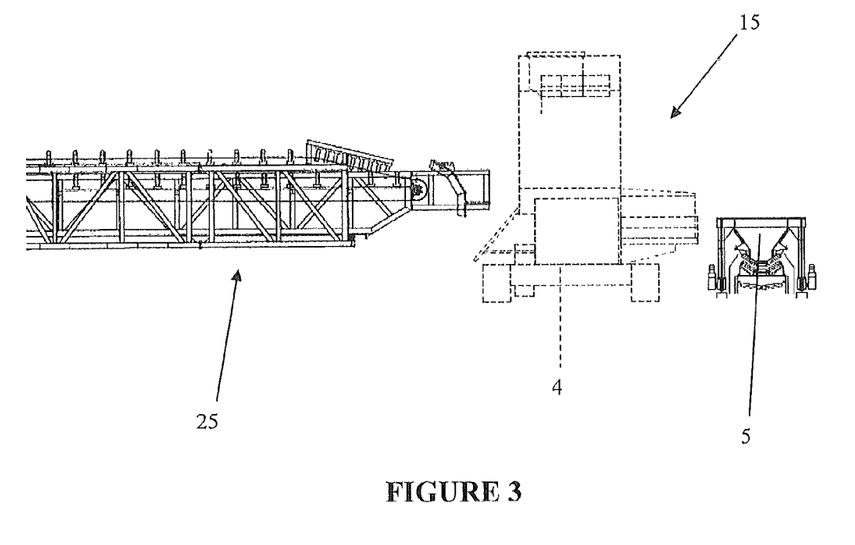
FIG. 3 is a fragmentary side elevational view of the head portion of the present preferred mobile stacking and reclaiming conveyor apparatus shown in FIG. 2, which is illustrated in a retracted position to permit a vehicle to pass between the stacking and reclaiming conveyor apparatus and a reclaim conveyor. The vehicle is shown in dotted line in FIG. 3.

Referring to FIGS. 1-3, a first present preferred stacking and reclaiming system 1 is illustrated. The system 1 includes a stacking overland conveyor 3 and a reclaiming overland conveyor 5. The stacking overland conveyor 3 may receive feed or material from a source, such as shipments of material or a bin that is loaded with material. The overland reclaiming conveyor 5 is configured to bring stacked material to a particular destination, such as a depot used by a power plant for burning the material or otherwise using the material to create energy. Preferably, the stacking and reclaiming conveyors 3 and 5 are configured to convey bulk material such as mineral, ore, or agglomerated material.

At least one mobile overland tripper 17 is positioned between a portion of the stacking overland conveyor 3 and a mobile stacking and reclaiming conveyor apparatus 7. Each stacking and reclaiming conveyor apparatus 7 is preferably positioned between two stacking areas.

As may be seen in FIG. 1, a first mobile stacking and reclaiming conveyor apparatus is positioned between storage piles 9 and 10 and a second mobile stacking and reclaiming conveyor apparatus 7 is positioned between storage piles 11 and 12. Preferably, storage piles 11 and 12 are designated to store high grade material and storage piles 9 and 10 are designated for storing low grade material. However, each storage pile may store low or high grade material or material of an intermediate grade.

Each mobile stacking and reclaiming conveyor apparatus 7 has a stacking head portion 23 and a reclaiming head portion 25. Preferably, the stacking head portion 23 includes a luffing conveyor and the reclaiming head portion 25 has an extendable conveyor portion. The extendable conveyor portion of the reclaiming head portion 25 may move toward and away from the reclaim overland conveyor 5. Such movement can provide a gap to permit a moveable bucket wheel reclaimer 13 or other reclaimer to pass between the mobile stacking and reclaiming conveyor apparatus 7 and the overland reclaim conveyor 5 without requiring significant downtime or requiring movement of other portions of the mobile stacking and reclaiming conveyor apparatus 7. As may be seen in FIG. 3, the reclaiming head portion 25 in a retracted position permits a vehicle 4 to pass between the overland reclaiming conveyor 5 and the reclaiming head portion 25.

Figure 3A:
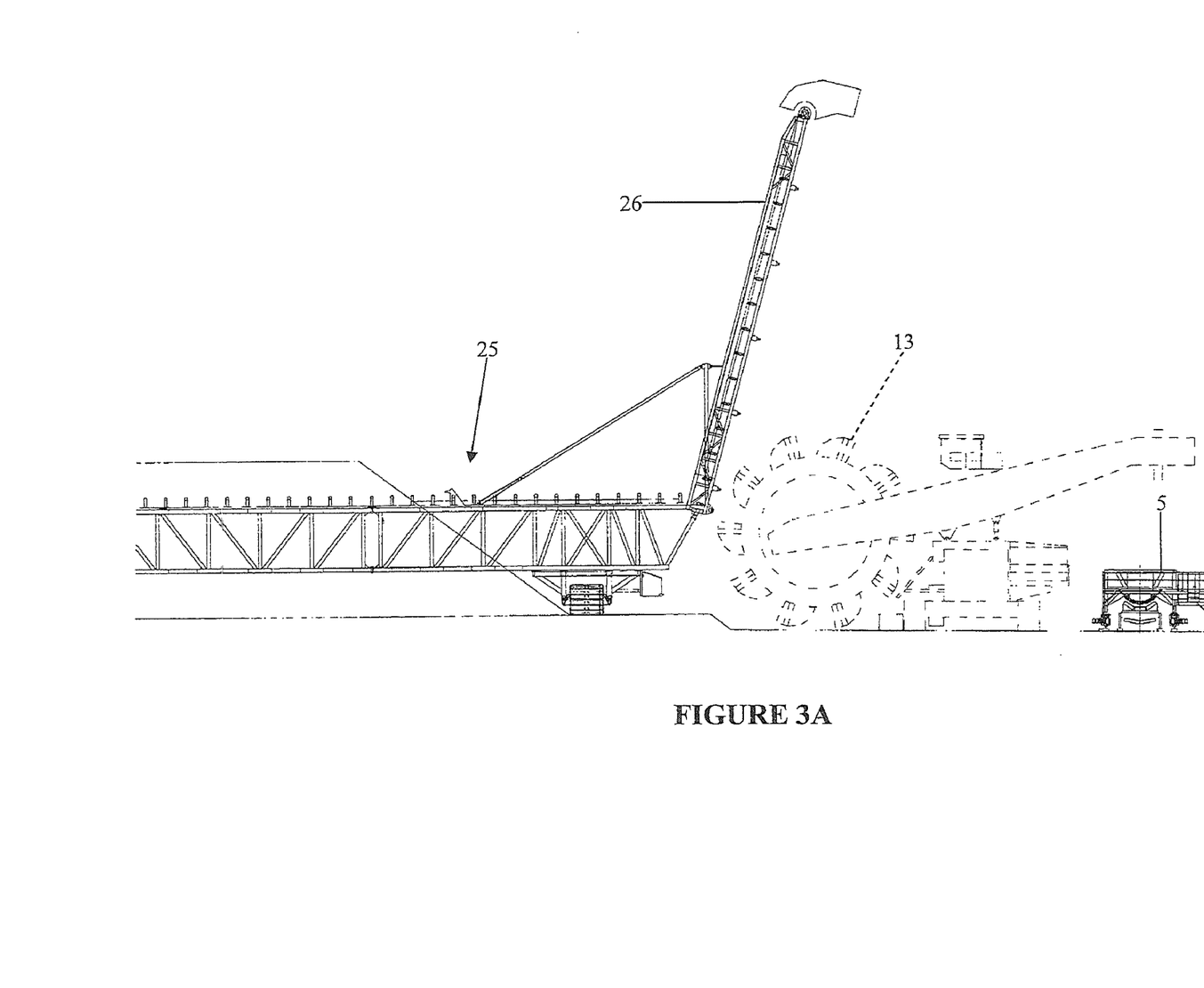
FIG. 3A is a fragmentary side elevational view of a head portion of a present preferred mobile stacking and reclaiming conveyor apparatus that includes a luffing end, which is illustrated in a retracted position to permit a bucket wheel reclaimer to pass between the stacking and reclaiming conveyor apparatus and a reclaim conveyor. The bucket wheel reclaimer is shown in dotted line in FIG. 3A.

In alternative embodiments, the head portion 25 may include a luffing end 26 that is moveable from a retracted position to an extended position, as may be appreciated from FIG. 3A. In the retracted position, the luffing end is positioned to provide a gap between the luffing end 26 and the overland reclaiming conveyor 5 to permit a bucket wheel reclaimer 13 to pass through the gap.

Referring to FIG. 2, each mobile stacking and reclaiming conveyor apparatus 7 includes at least one and, preferably, multiple intermediate conveyor frame portions 27 that are positioned between the stacking head portion 23 and the reclaiming head portion 25 of the apparatus 7. The intermediate frame portions 27 are interconnected together with the head portions 23 and 25. A belt is supported by these portions and is configured to move to transport material positioned on the belt. The belt may move along idlers or troughed idlers supported on the apparatus 7.

Preferably, the intermediate portions 27, reclaiming head portion 25 and stacking head portion 23 all include at least one set of tracks for moving each mobile stacking and reclaiming conveyor apparatus 7. At least one set of these tracks 28 may be configured to pivot or rotate such that the mobile stacking and reclaiming conveyor apparatus 7 can turn or pivot. Preferably, the tracks 28 are set in a particular position to permit side to side movement between adjacent storage piles, such as storage piles 9 and 10.

The interconnected portions of the mobile stacking and reclaiming conveyor apparatus 7 include rails 29 that support movement of at least one hopper 18 and tripper 19. Each hopper and tripper has wheels configured for movement along the rails 29. Preferably, the trippers and hoppers are configured to be releasably interconnected such that an interconnected hopper and tripper can move as a unitary unit, but also be separated and moved independently of one another.

The trippers 19 are configured to provide a cross conveyor between storage piles to permit stacking to storage piles of opposite sides of the mobile stacking and reclaiming conveyor apparatus 7. For example, the mobile stacking and reclaiming conveyor apparatus 7 positioned between storage piles 9 and 10 includes a mobile tripper 19 that may stack material from storage piles 9 or 10. The tripper 19 includes a cross conveyor that may permit stacking of material adjacent to either side of the apparatus 7 such that the apparatus may stack material into two different storage piles. The cross conveyor may be above and transverse to the conveyor moving adjacent the top of the intermediate rails. Preferably, the cross conveyor is perpendicular to this conveyor. In alternative embodiments, the cross conveyor may also be configured to only discharge material from only one side of the apparatus 7 in the event the apparatus 7 is configured to stack or reclaim material from only one storage pile.

For reclaiming material from a pile, a mobile hopper 18 may be moved adjacent to a bucket wheel reclaimer or other reclaimer such that material is fed into the hopper 18 and subsequently positioned on the conveyor for transport to the overland reclaim conveyor. For instance, material may be transported from the bucket wheel reclaimer to the mobile hopper 18 to locate the material onto the conveyor belt of the apparatus 7 for reclaiming the material. Alternatively, the mobile hopper 18 may be moved adjacent to the reclaimer to receive material from the reclaimer and then releasably interconnected to a portion of the reclaimer to lock the position of the hopper 18 to receive material and position that material onto the conveyor belt or other elongated member moving to convey the material to the reclaim overland conveyor.

Once the material has been located onto the conveyor belt or other elongated member, the material may be moved toward the reclaiming head portion 25 to reclaim the material. The reclaiming head portion 25 is extended to provide material to the overland reclaim conveyor 5. Such material may be transferred through a hopper to position the material onto the overland reclaim conveyor.

For stacking material, the material to be stacked may be transported along the stacking conveyor 3 to a mobile overland tripper 17. The mobile overland tripper 17 may receive certain material for stacking and transfer that material to the head portion 23 of the mobile stacking and reclaiming conveyor apparatus 7. The head portion 23 may include a luffing conveyor configured to receive the material from the mobile overland tripper 17. The material may then be conveyed to the tripper 19 to stack in a particular storage pile. The tripper 19 transfers the material to the cross conveyor for stacking into a storage pile. The cross conveyor may move in opposite directions to permit stacking in different storage piles located on opposite sides of the apparatus 7, such as storage piles 9 and 10. Adjustment of a location for stacking may easily and quickly be made by moving the tripper 19 along the rails of the intermediate frame portions 27 to a new location.

Preferably, the conveyor belt of the mobile stacking and reclaiming conveyor apparatus 7 that moves to reclaim material and feed the mobile tripper 19 for stacking material is configured to only move in one direction, which runs from the stacking overland reclaimer 3 to the reclaiming overland conveyor 5. Preferably, the mobile tripper 19 is positioned to precede the mobile hopper 18 such that the hopper 18 is positioned between the mobile tripper 19 and the end 25 of the mobile stacking and reclaiming conveyor apparatus 7. It should be understood that such an arrangement of overland conveyors, the mobile stacking and reclaiming conveyor apparatus 7, mobile tripper 19 and mobile hopper 18 can permit the mobile tripper 19 to stack material via the cross conveyor while a reclaimer reclaims material from a storage pile and feeds that material into the hopper 18 for transport to the reclaiming overland conveyor at the same time.

It should be understood that the mobile stacking and reclaiming conveyor apparatus 7, mobile hopper 18 and mobile tripper 19 permit rectangular stacking in a storage pile to help maximize the utilization of space within a designated storage pile area. For instance, unlike radial stackers, the mobile stacking and reclaiming conveyor apparatus 7 permits rectangle stacking via the cross conveyor of the mobile tripper 19 and, therefore, can utilize corners a radial stacker cannot utilize. Also, separate conveying paths for reclaiming and stacking are not needed, which reduces the cost of equipment and the amount of space needed for embodiments of our system. Indeed, the material flow is simplified to only one direction and along one route, which simplifies site layout requirements and helps minimize the amount of equipment necessary to conduct stacking and reclaiming operations.

Figure 4:
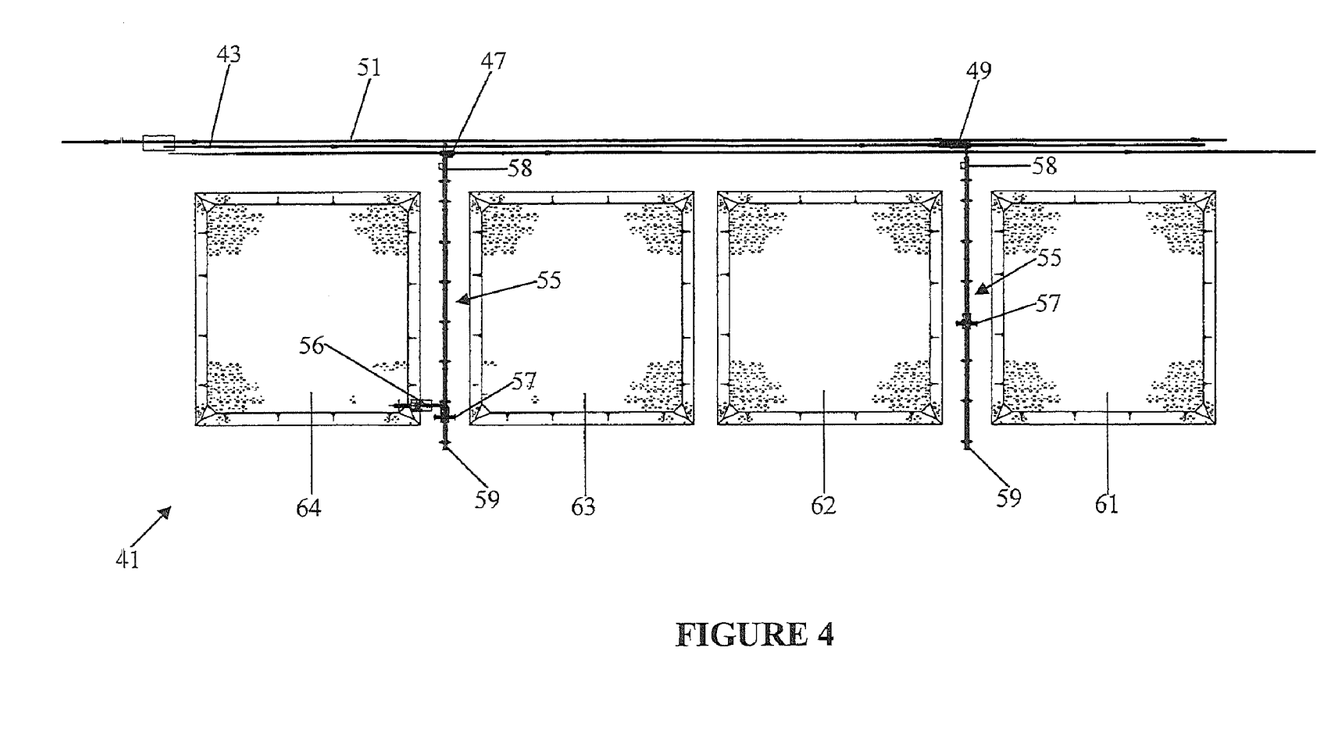
FIG. 4 is layout of a second present preferred embodiment of a stacking and reclaiming system.
Figure 5:
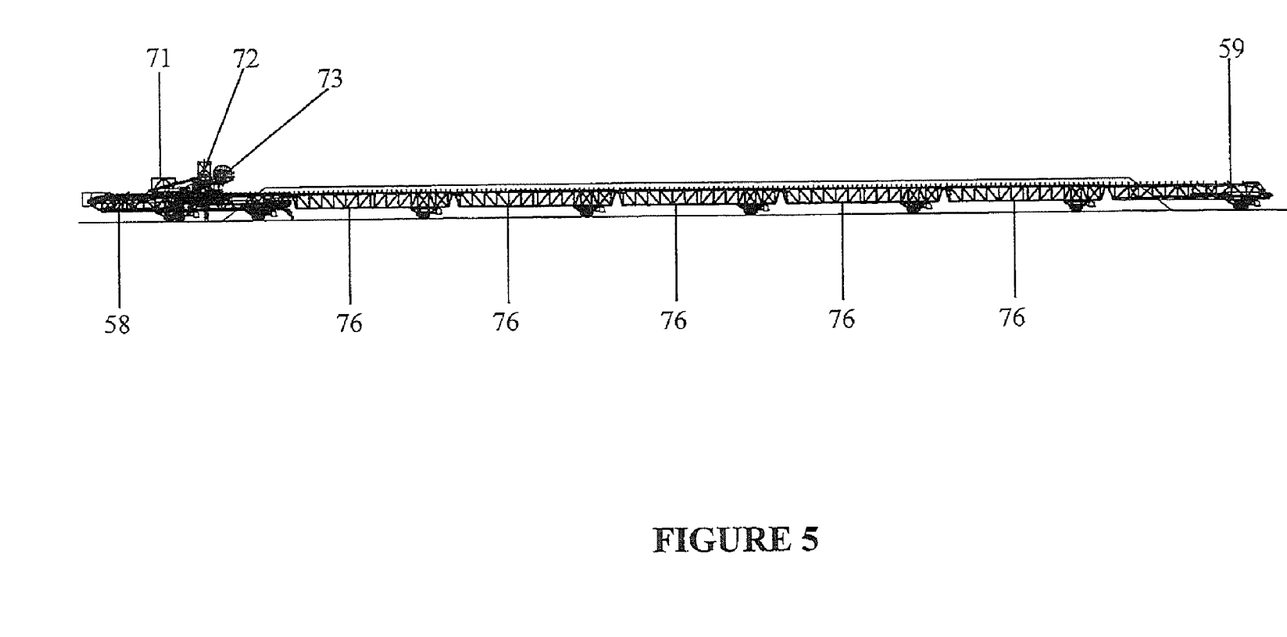
FIG. 5 is a side elevation view of a present preferred embodiment of a mobile stacking and reclaiming conveyor apparatus that may be used in the second present preferred stacking and reclaiming system.
Figure 6:
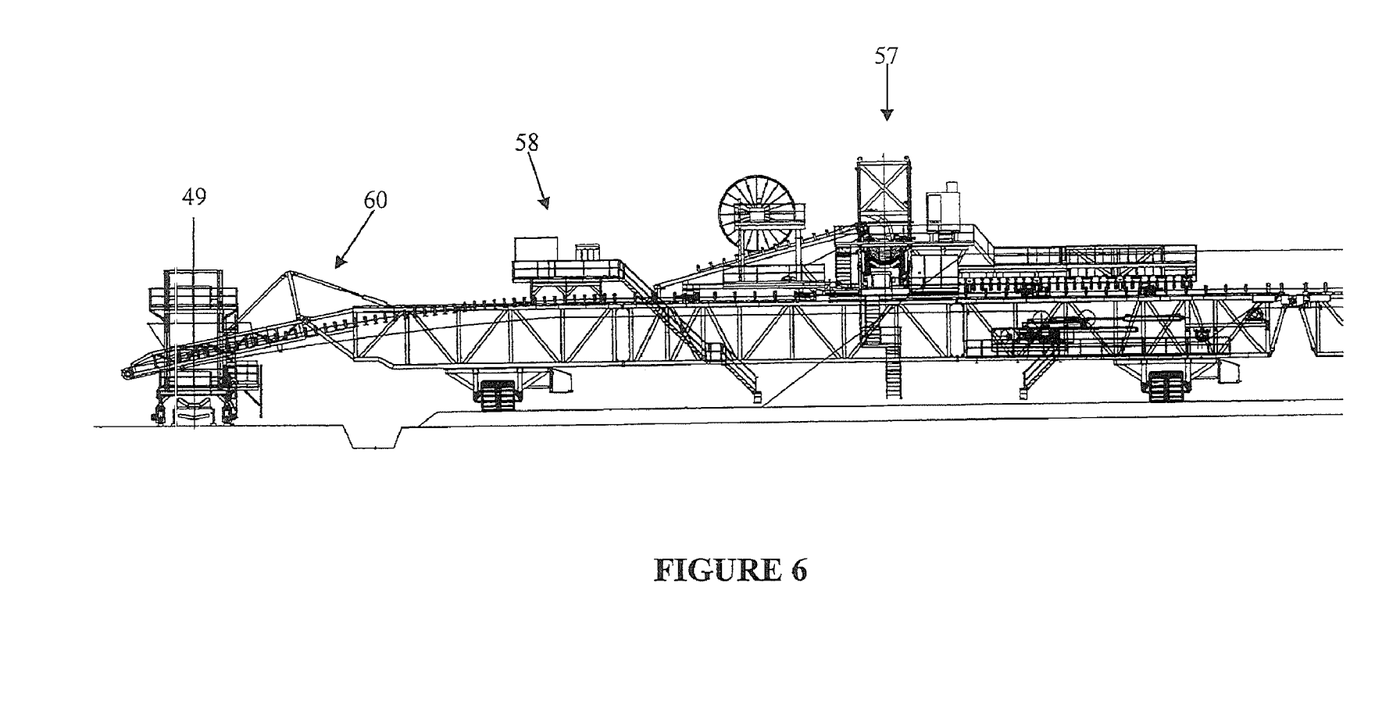
FIG. 6 is a side elevation view of a present preferred mobile stacking and reclaiming conveyor apparatus having the mobile hopper and tripper positioned near the mobile overland tripper of the second present preferred system.

Referring to FIGS. 4-6, a second present preferred system 41 can also be used for stacking and reclaiming material. The system 41 includes a stacking feed overland conveyor 43 and reclaim overland conveyor 51 positioned adjacent to each other and moving parallel to each other. The stacking overland conveyor 43 may move material in a direction that is opposite the direction the reclaiming overland conveyor 51 moves material. At least one mobile overland tripper 49 may be positioned to feed material to mobile stacking and reclaim bridges 55. The mobile overland tripper 49 is preferably positioned between the reclaim conveyor 51 and the stacking feed conveyor 43. Preferably, a mobile stacking and reclaim bridge 55 is positioned between storage pile 61 and storage pile 62 and a second bridge 55 is positioned between storage pile 63 and storage pile 64. Each bridge 55 includes a conveyor belt configured to move in a first direction and a second direction that is opposite the first direction. Movement in a first direction may provide for the handling of material for stacking. Movement in the opposite, second direction may provide for reclaiming of material from a storage pile.

Each mobile stacking and reclaim bridge 55 includes a mobile tripper interconnected with a mobile hopper 57 ("MTH"). The tripper portion includes a cross conveyor for conveying material to different sides of the bridge 55. For instance, the cross conveyor may be configured to move in opposite directions for stacking material onto storage piles 61 and 62. The MTH 57 may be configured to permit the mobile hopper and mobile tripper portions of the MTH 57 to be releasably interconnected. Alternatively, the MTH 57 may not include separable hopper and tripper portions.

As may be seen in FIG. 5, the MTH may include a hopper 71, a tripper 72 and a cross conveyor 73. The MTH 57 may move between a head portion 59 and head portion 58 along rails supported by the head portions 58 and 59 and intermediate frame portions 76. The head portion 58 may include an extendable conveyor portion, extendable luffing conveyor portion 60, or extendable frame for moving a portion of the head portion 58 to a position for receiving stacking material from the mobile overland tripper 49 or to position material through a hopper for feeding onto the reclaiming overland conveyor 45. For instance, the head portion 58 may be extended to receive material from an overland tripper 49 for stacking or be retracted to feed material to a mobile overland hopper 47 positioned on a reclaim conveyor 45. The moveable or extendable head portion or luffing conveyor portion 60 can also permit movement of that portion 60 to provide space for vehicles to pass between the head portion 58 and mobile overland tripper 49 or other conveyor.

The conveyor belt of the mobile stacking and reclaim bridge 55 can move in opposite directions. In a first direction, the conveyor travels along head portions 58 and 59 and intermediate portions 76 to transport material for stacking. The conveyor belt of the mobile stacking and reclaim bridge 55 also moves in a second direction that is opposite the first direction to receive material from a storage pile and transport that material to the overland reclaim conveyor 45. Preferably, a mobile overland hopper 47 is positioned between the reclaim conveyor 45 and the head portion 58 of the bridge to help feed material onto the reclaim conveyor 45.

A bucket wheel reclaimer 56 may be provided in each storage pile or in just one storage pile for reclaiming operations. Of course, other reclaimers may also be used in the system 41. The bucket wheel reclaimer 56 may move to different locations for reclaiming material. The MTH 57 may move along the rails of the bridge to different locations to receive material from the reclaimer. The MTH 57 may also be configured for releasable connection to the bucket wheel reclaimer 56 after the reclaimer and MTH 57 are positioned for reclaiming material at a particular location to help ensure the MTH 57 is positioned properly for reclaiming material.

It should be understood that the bucket wheel reclaimer 56 is configured to transport material to the hopper portion 71 of the MTH 57. The hopper portion 71 helps locate material onto the conveyor of the mobile stacking and reclaim bridge 55 for transport to the reclaim overland conveyor 45.

It should be appreciated that the MTH 57 and mobile stacking and reclaim bridge 55 permit rectangular stacking in a storage pile to help maximize the utilization of space within a designated storage pile area. For instance, unlike radial stackers, the mobile stacking and reclaim bridge 55 permits rectangle stacking and, therefore, can utilize corners a radial stacker cannot utilize. Also, separate conveying paths for reclaiming and stacking are not needed, which reduces the cost of equipment and the amount of space needed for embodiments of our system.

Figure 7:
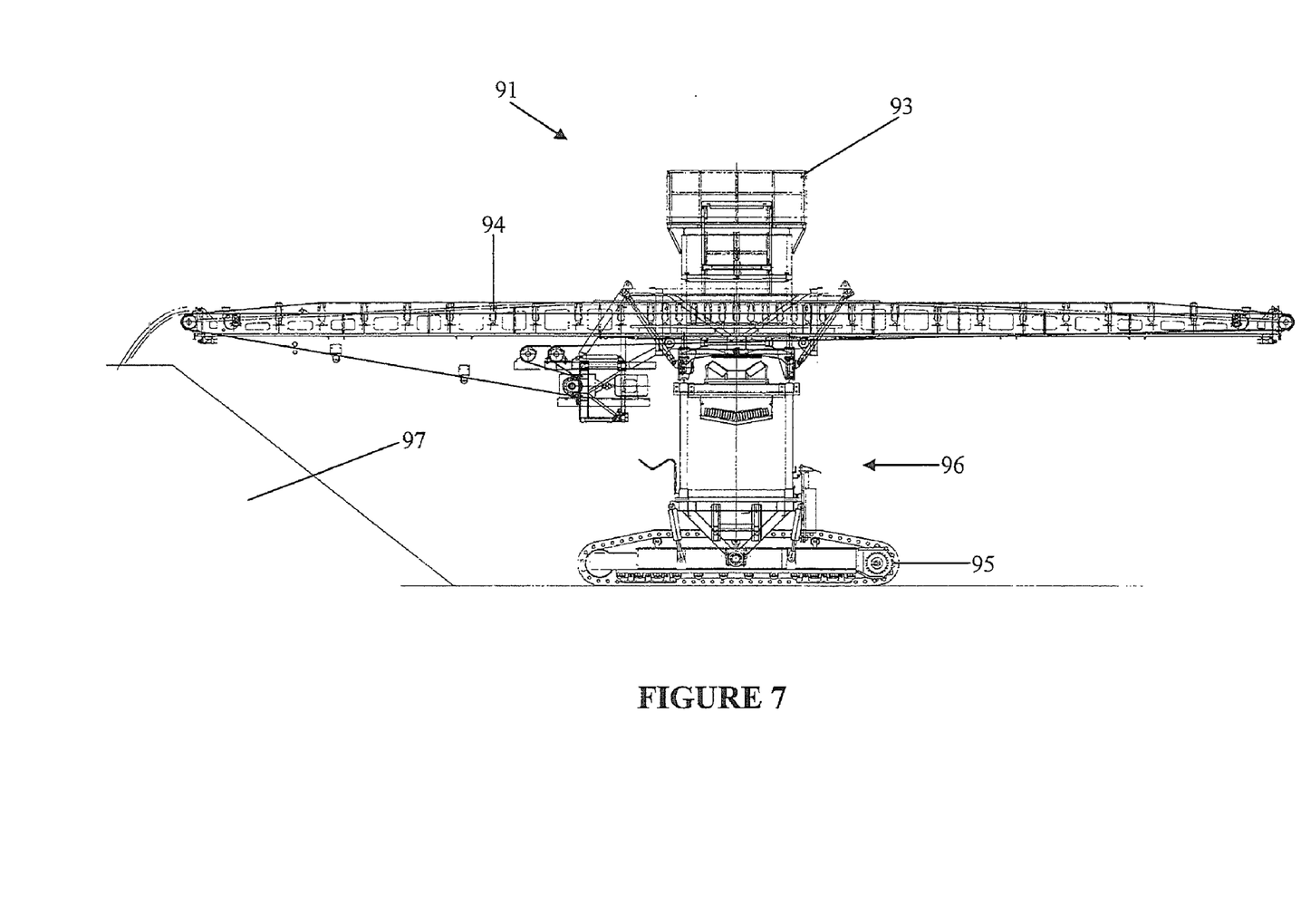
FIG. 7 is an end view of a present preferred embodiment of the mobile stacking and reclaiming conveyor apparatus shown in Figures positioned for stacking.
Figure 8:
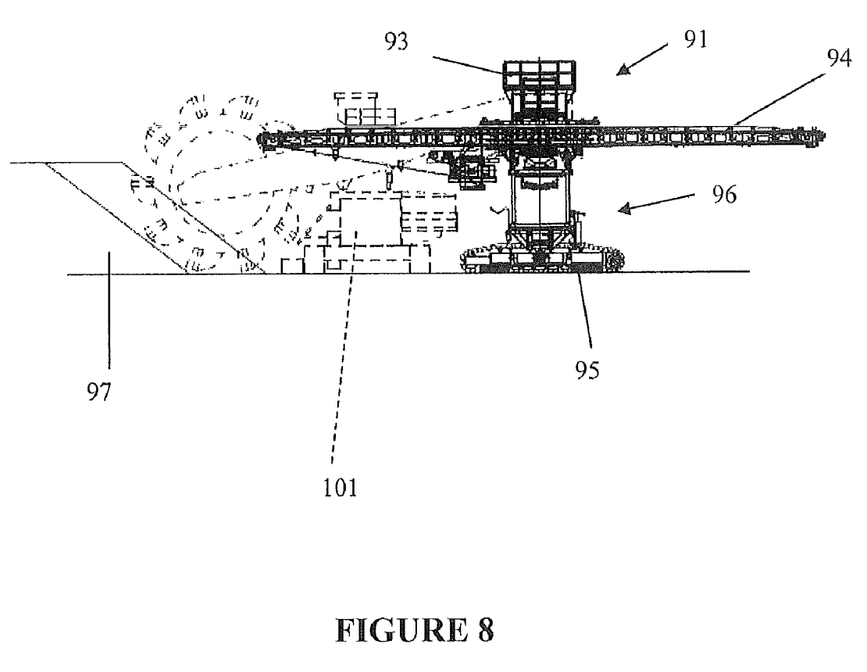
FIG. 8 is an end view similar to FIG. 7 of the present preferred embodiment of the mobile stacking and reclaiming conveyor apparatus positioned for reclaiming adjacent to a bucket wheel reclaimer. The bucket wheel reclaimer is shown in dotted line.

Referring to FIGS. 7-8, a mobile stacking and reclaiming apparatus 91 can include a tripper 92 that has a cross conveyor 94 and a hopper 93. The tripper 92 and hopper 93 are moveably supported on a base 96. The base may include tracks 95 to permit the apparatus 91 to move. The base 96 may also support rails upon which the hopper 93 and tripper 92 may move. The tripper 92 and hopper 93 may move independently along the rails or may be interconnected and move synchronously along the rails.

The apparatus 91 can be configured to convey material into a stack 97. The cross conveyor 94 may move in opposite directions for conveying and stacking material on opposite sides of the apparatus 91. It is also contemplated that the cross conveyor 94 may include an adjustable or rotatable luffing conveyor portion on one or both ends of the cross conveyor for stacking material. As may be seen in FIG. 8, a bucket wheel reclaimer 101 may be positioned adjacent to the hopper 93 of the apparatus 91 for transporting material in a stack 97 to another location to reclaim that material. A portion of the reclaimer 101 may be releasably interconnected to the hopper 93 for receiving material from the reclaimer 101.

Figure 9:
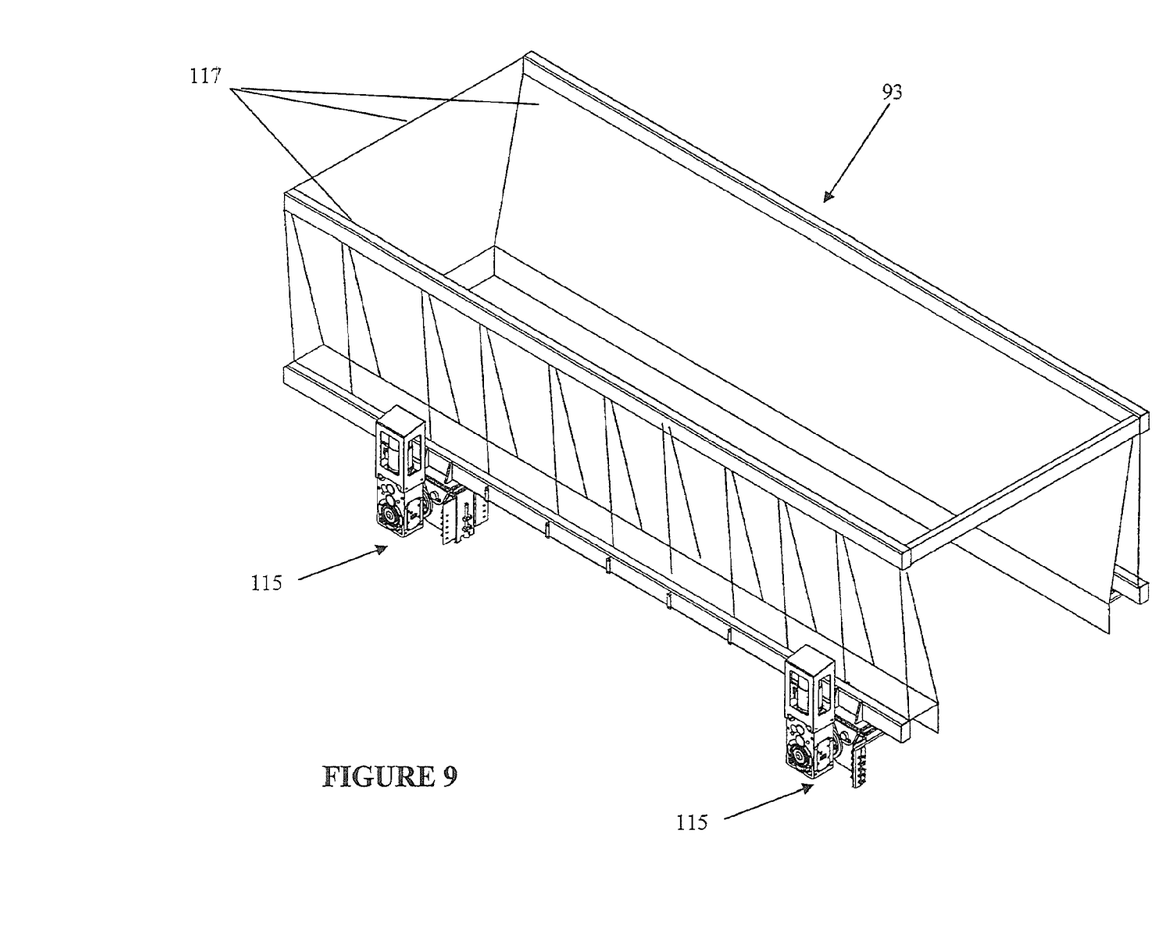
FIG. 9 is a perspective view of a present preferred embodiment of mobile hopper that may be moveably interconnected to an embodiment of the mobile stacking and reclaiming conveyor apparatus.
Figure 10:
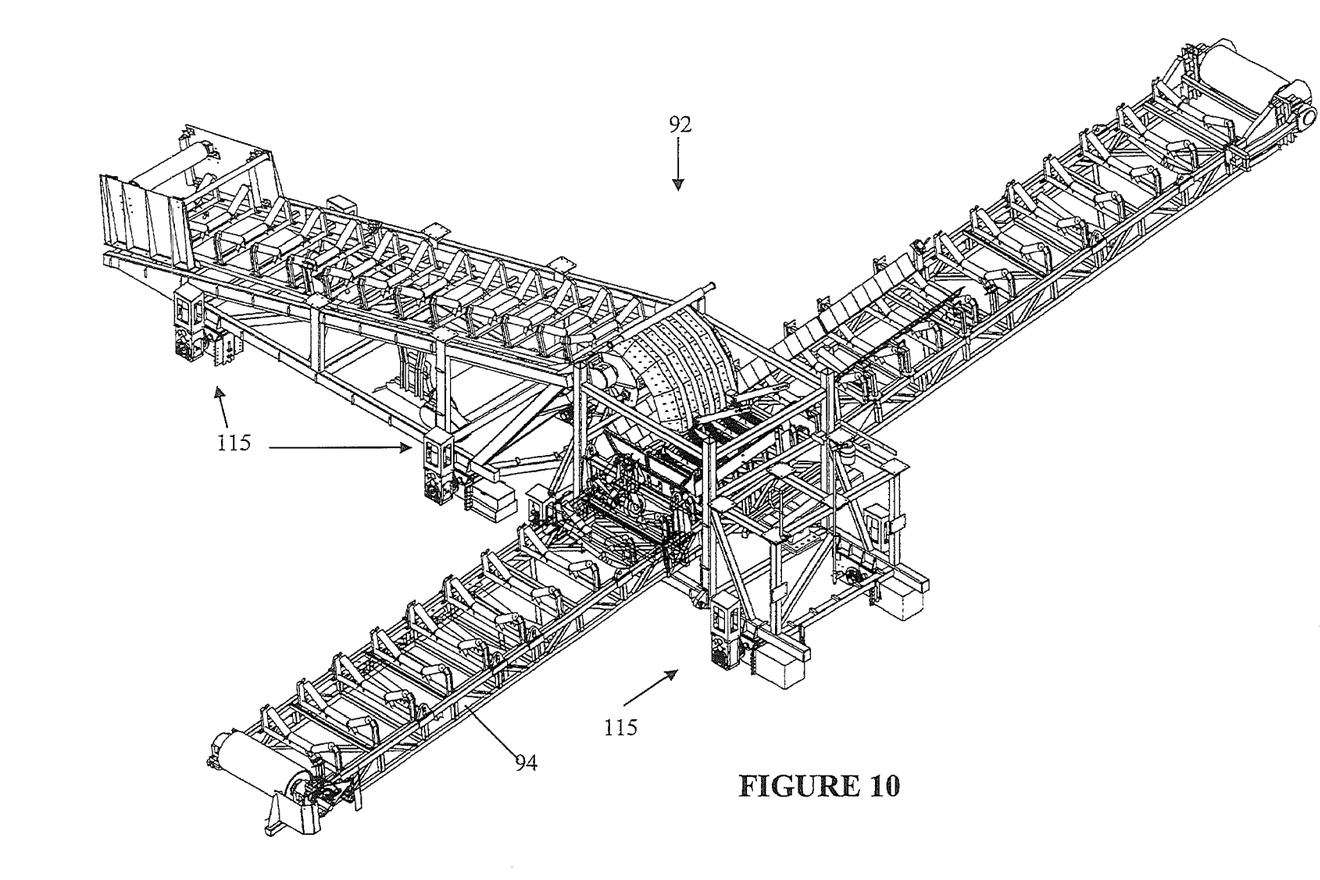
FIG. 10 is a perspective view of a present preferred embodiment of a mobile tripper that may be moveably interconnected to an embodiment of the mobile stacking and reclaiming conveyor apparatus.

As may be seen in FIGS. 9-10, the tripper 92 and hopper 93 each include wheels 115 configured to connect to the base such that the hopper 93 and tripper 92 may move along the upper surface of the base 96 adjacent to the conveyor belt of the apparatus 91. As may best be seen in FIG. 9, the hopper includes sidewalls 117 that define an opening 118 that is sized and configured to receive material from a reclaimer. The sidewalls 117 are configured to position the material onto the conveyor of the apparatus 91 so the conveyor belt may transport the material to a reclaiming destination.

As may best be seen in FIG. 10, the tripper 92 includes an inclined conveyor portion 121 that is positioned adjacent to and perpendicular to the cross conveyor 94 and is configured to feed material to the cross conveyor 94.

The tripper 92 and hopper 93 may be releasably interconnected by different mechanisms, such as, for example, trailer links configured to releasably interconnect. As another example, the tripper may include a hitch and the hopper may have a receiver hitch for interconnecting with the hitch of the tripper. Alternatively, the tripper 92 may include a coupling configured to releasably connect to a coupling on the hopper 93.

To prevent the tripper 92 from crashing into hopper 93, we prefer to include a crash prevention device that prevents or helps reduce the likelihood that a user may move the hopper 93 into the tripper 92 without trying to interconnect the hopper 93 and tripper 92. Such a safety device may include an automatic braking system that is activated when the hopper or tripper is sensed as being within a certain distance of the other device and also over a predefined speed. Alternatively, the safety device may also include bumpers that are configured to absorb a sufficient amount of force that may be transferred during accidental contact between the tripper and hopper. Of course, the safety device may include both bumpers and the automatic braking system. Other alternative safety mechanisms may also be utilized to avoid accidental crashes between the tripper 92 and hopper 93 when moving independently of each other.

It should be appreciated that embodiments of our system may need only one moveable reclaimer to reclaim material from any number of storage piles. Of course, multiple reclaimers may be utilized to reduce the downtime associated with reclaimer movement and increase flexibility for reclaiming operations.

The systems disclosed above can be configured to permit a quick change from stacking to reclaiming. For instance, only a quick horizontal move may be needed to adjust from stacking material in one storage pile to reclaiming material for a second storage pile. Additionally, a relatively quick movement of the mobile tripper or mobile hopper may be needed to adjust from stacking to reclaiming. Such adjustment may take minutes to complete. In contrast, other systems typically require an entire bridge conveyor to be moved in a complex path to provide such functionality, which often takes very long periods of time, such as multiple days.

It should be appreciated that a general contractor or other entity may provide an embodiment of the system to a client. The method of providing such a system may include providing at least one overland reclaiming conveyor, providing at least one overland stacking conveyor, and providing at least one stacking and reclaiming apparatus that includes a connected mobile hopper and a mobile tripper. Embodiments of the method may also include providing one or more overland trippers, one or more overland hoppers or one or more reclaimers. Of course, designing a site layout or designating certain areas for storage piles may also be included in embodiments of the method.

It should be understood that a general contractor may be considered to provide certain features even if a subcontractor installs or makes those features for a client of the general contractor. For instance, a general contractor can provide a client an overland conveyor, overland tripper or overland hopper even if a subcontractor offers to make or makes one or more of these devices or installs the devices pursuant to an agreement with the general contractor. A general contractor may also be considered to provide a feature or device, such as an overland conveyor or other device, by offering to make or install such a device for a client.

While certain present preferred embodiments of the method, device and system for stacking and reclaiming material have been shown and described above, it is to be distinctly understood that the invention is not limited thereto but may be otherwise variously embodied and practiced within the scope of the following claims.

What is claimed is:

1. A method for providing a system to reclaim and stack material comprising:
   providing at least one stacking overland conveyor configured to convey material for stacking material;
   providing at least one reclaiming overland conveyor configured to convey material for reclaiming material;
   providing at least one mobile stacking and reclaiming apparatus, the at least one mobile stacking and reclaiming apparatus comprising a moveable bridge configured and operable for overland mobility comprised of a first end, a second end, and at least one intermediate portion between the first and second ends, a moveable hopper connected to the moveable bridge, the moveable hopper being moveable relative to the moveable bridge along at least a portion of the moveable bridge, a moveable tripper connected to the moveable bridge, the moveable tripper being moveable relative to the moveable bridge along at least a portion of the moveable bridge, the moveable tripper being moveable independent of the moveable hopper; and
   the at least one mobile stacking and reclaiming apparatus being provided such that the at least one mobile stacking and reclaiming apparatus is positionable adjacent to the at least one stacking overland conveyor and the at least one reclaiming overland conveyor; and
   wherein the moveable tripper transports material during stacking operations of the mobile stacking and reclaiming apparatus and the moveable hopper receives material during reclaiming operations of the mobile stacking and reclaiming apparatus.

2. The method of claim 1 wherein the moveable hopper is releasably attached to the moveable tripper.

3. The method of claim 1 wherein the moveable hopper is comprised of a plurality of interconnected sidewalls that define an opening sized and configured to receive material from a reclaimer, the opening of the moveable hopper sized and configured such that material passes through the opening and onto a conveyor of the moveable bridge.

4. The method of claim 3 wherein the moveable hopper is also configured to be releasably connected to a portion of the reclaimer.

5. The method of claim 1 wherein the moveable bridge is further comprised of a plurality of rails that extend along at least a portion of the moveable bridge, the rails sized and configured to define a path of travel for the moveable hopper and the moveable tripper.

6. The method of claim 5 wherein at least one of the first end and the second end of the moveable bridge is a luffing end that is moveable from a retracted position to an extended position.

7. The method of claim 6 wherein at least one of the first end and the second end of the moveable bridge is extendable from a retracted position to an extended position.

8. The method of claim 1 wherein the moveable hopper is moveable relative to the moveable tripper.

9. The method of claim 1 further comprising providing at least one reclaimer that is positionable adjacent to the moveable hopper to reclaim material.

10. The method of claim 1 wherein the at least one mobile stacking and reclaiming apparatus is positioned between the at least one stacking overland conveyor and the at least one reclaiming overland conveyor.

11. The method of claim 10 wherein the moveable bridge is also comprised of a first conveyor that is moveable in a first direction and wherein the moveable tripper is comprised of an inclined conveyor and a cross conveyor, the inclined conveyor positioned adjacent to the cross conveyor and configured to feed material to the cross conveyor, the cross conveyor being transverse to the first conveyor and the inclined conveyor, the cross conveyor configured to stack material.

12. The method of claim 1 wherein the first end of the at least one mobile stacking and reclaiming apparatus is positioned adjacent to the at least one stacking overland conveyor and the at least one reclaiming overland conveyor.

13. The method of claim 12 wherein the moveable bridge is also comprised of a first conveyor that is moveable in a first direction and wherein the moveable tripper is comprised of an inclined conveyor and a cross conveyor, the inclined conveyor positioned adjacent to the cross conveyor and configured to feed material to the cross conveyor, the cross conveyor being transverse to the first conveyor and the inclined conveyor, the cross conveyor configured to stack material.

14. The method of claim 13 wherein the first conveyor is also moveable in a second direction that is opposite the first direction, the first conveyor configured to move in the first direction to stack material and move in the second material to reclaim material received from a reclaimer.

15. The method of claim 14 wherein the moveable hopper is comprised of a plurality of interconnected sidewalls that define an opening sized and configured to receive material from the reclaimer, the opening of the moveable hopper sized and configured to permit material to pass through the opening and onto the first conveyor.

16. The method of claim 1 wherein the moveable hopper is releasably connectable to the moveable tripper such that the moveable hopper and moveable tripper synchronously move when interconnected and independently move when separated.

17. The method of claim 1 wherein the at least one mobile stacking and reclaiming apparatus is provided such that the at least one mobile stacking and reclaiming apparatus is sized and configured to be positioned between the at least one stacking overland conveyor and the at least one reclaiming overland conveyor.

18. The method of claim 1 wherein the at least one mobile stacking and reclaiming apparatus is provided such that the first end of the at least one mobile stacking and reclaiming apparatus is positioned adjacent to the at least one stacking overland conveyor and the at least one reclaiming overland conveyor.

\* \* \* \* \*